C. CRAIN & E. L. WEMPLE.
BALANCE SCALE.
No. 1,546. Patented Apr. 8, 1840.
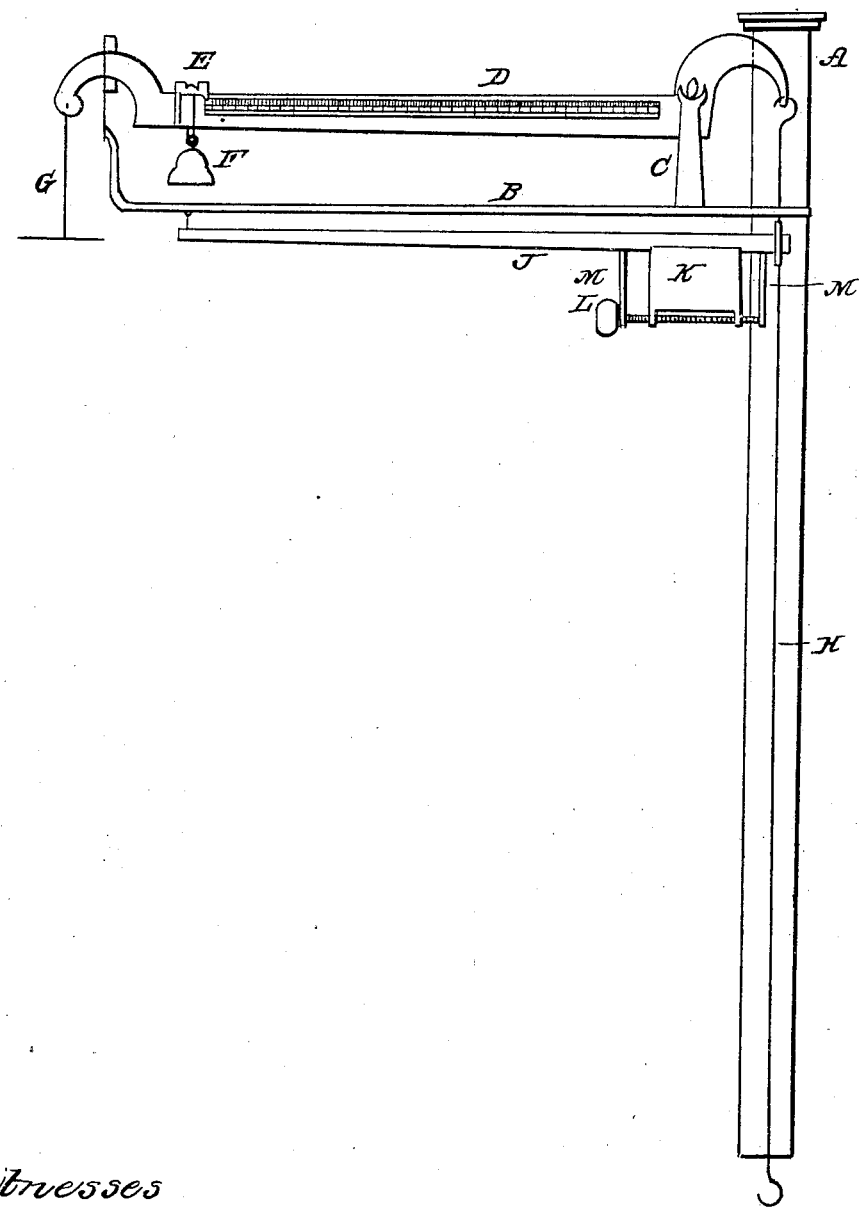
Witnesses
Orrin Jefferson
James Miller
Inventor;
Chauncey Crain

UNITED STATES PATENT OFFICE.

CHAUNCEY CRAIN AND E. L. WEMPLE, OF MADISON, NEW YORK.

CONSTRUCTION OF PLATFORM-BALANCES.

Specification of Letters Patent No. 1,546, dated April 8, 1840.

*To all whom it may concern:*

Be it known that we, CHAUNCEY CRAIN and EVERT L. WEMPLE, of the town and county of Madison, in the State of New York, have invented a new and useful Improvement in Platform-Scales; and we do hereby declare that the following is a full and exact description.

The nature of our invention consists in providing the graduated lever with a clasp to which the movable weight is connected the clasp is found with pointers to indicate the amount of weight on the platform also the arrangement of a lever for balancing the scale.

To enable others skilled in the art to make and use our improvement we will proceed to describe its construction and operation.

We form a standard and other appendages similar to those in common use except that we form the upper edge of the graduated lever with a smooth surface and form a clasp to slide on the bar with a pointer on each side of the bar and attach the movable weight to the clasp for the purpose of balancing the levers. We form a mortise in the rod that connects the levers below the platform to the graduated lever a little below the arm that projects from the standard through which we pass one end of a lever on which the weight is suspended for balancing the levers and secure it with a pin. The opposite end of this lever we connect to the outward end of the arm on the underside with a staple and link to allow it to vibrate if necessary to favor the movement of the connecting rod. This lever is furnished with two studs projecting downward sufficient distance apart, to admit a suitable weight between them to balance the scale with room to move. For the purpose we form the weight with a groove in the upper edge to admit of its clasping and sliding on the lever. To support and move the weight we pass a screw through the lower end of the studs and through the weight. The screw is smooth where it passes through the studs and the hole through the weight is formed with a thread to match the screw, so that by turning the screw the weight may be drawn from or driven toward the connecting rod to increase or diminish its action on the upper lever.

What we claim as our invention and desire to secure by Letters Patent is—

1. The method of balancing the levers by means of the weight K suspended from the lever, I, between the pendents M, M, and adjusted by the screw L, the whole being constructed and operating in the manner set forth.

2. We claim also forming the graduated lever with a clasp to which the movable weight is attached with pointers to indicate by the lines on the lever the amount of weight on the platform.

CHAUNCEY CRAIN.
E. L. WEMPLE.

Witnesses:
JOHN W. FARWELL,
DAVID GASTON.